United States Patent
Worms et al.

(10) Patent No.: US 12,422,338 B2
(45) Date of Patent: Sep. 23, 2025

(54) ENGINE PRE TURBINE PRESSURE MONITORING SYSTEM

(71) Applicant: DAF Trucks N.V., Eindhoven (NL)

(72) Inventors: Luc Hubertus Josephina Worms, Eindhoven (NL); Maarten Robertus Ingmar Nieuwenhuijze, Vlijmen (NL)

(73) Assignee: DAF Trucks N.V., Eindhoven (NL)

( * ) Notice: Subject to any disclaimer, the term of this patent is extended or adjusted under 35 U.S.C. 154(b) by 128 days.

(21) Appl. No.: 18/307,169

(22) Filed: Apr. 26, 2023

(65) Prior Publication Data
US 2023/0384183 A1  Nov. 30, 2023

(30) Foreign Application Priority Data
May 20, 2022  (NL) ..................... 2031951

(51) Int. Cl.
G01M 15/09 (2006.01)

(52) U.S. Cl.
CPC .................... G01M 15/09 (2013.01)

(58) Field of Classification Search
CPC .. F02B 37/24; F02D 41/1445; F02D 41/1446; F02D 41/1448; F02D 41/18; F02D 2041/1433; F02D 2200/0402; F02D 2200/0414; F02D 41/0007; F02D 41/145
See application file for complete search history.

(56) References Cited

U.S. PATENT DOCUMENTS

2003/0004677 A1 * 1/2003 Olin .................... F02D 41/0235
                                                                   702/140
2015/0345377 A1  12/2015 Ge et al.

FOREIGN PATENT DOCUMENTS

| FR | 3014145 A1 | 6/2015 | |
| FR | 3033641 B1 * | 6/2019 | ......... F02D 41/0007 |
| JP | 2003049668 A * | 2/2003 | ................ F01L 1/34 |
| WO | 2008024590 A2 | 2/2008 | |
| WO | WO-2011067491 A1 * | 6/2011 | ............ F02B 37/004 |

OTHER PUBLICATIONS

Translation FR-3033641-B1 (Year: 2024).*
Translation JP-2003049668-A (Year: 2024).*
Translation WO-2011067491-A1 (Year: 2024).*
Wang et al. "Exhaust Backpressure Estimation for an Internal Combustion Engine with a Variable Geometry Turbo Charger" SAE 2010 Commercial Vehicle Engineering Congress SAE Technical Papers, 2009.

(Continued)

*Primary Examiner* — J. Todd Newton
(74) *Attorney, Agent, or Firm* — Banner & Witcoff, Ltd.

(57) ABSTRACT

A pressure monitor is arranged to calculate a pre-turbine pressure. The monitor is programmed to derive a normalized turbine speed, normalized for a pre turbine temperature, and a heat capacity ratio of exhaust gas before the turbine as first inputs; determine a turbine power normalizing factor as a second input; determine an actual turbocompressor power value as a third input; derive, for said first inputs, a linear relation between a turbine expansion ratio and a turbine power value normalized by the second input; and equate the turbine power value to the actual turbocompressor power; thereby deriving the pre turbine pressure from said linear relation, as an output.

12 Claims, 4 Drawing Sheets

(56) References Cited

OTHER PUBLICATIONS

Fredriksson et al. "Estimating Exhaust Manifold Pressure in a Turbocharged Diesel Engine" Proceedings of the 2002 IEEE International Conference on Control Applications, 2002, p. 701-706.
Feb. 9, 2023 (NL) Search Report Application No. 2031951.

* cited by examiner

ENGINE PRE TURBINE PRESSURE MONITORING SYSTEM

RELATED APPLICATIONS

This application claims priority under 35 U.S.C. § 119 to Application NL 2031951, filed on May 20, 2022, which is hereby incorporated by reference in its entirety.

BACKGROUND

Figure 1:
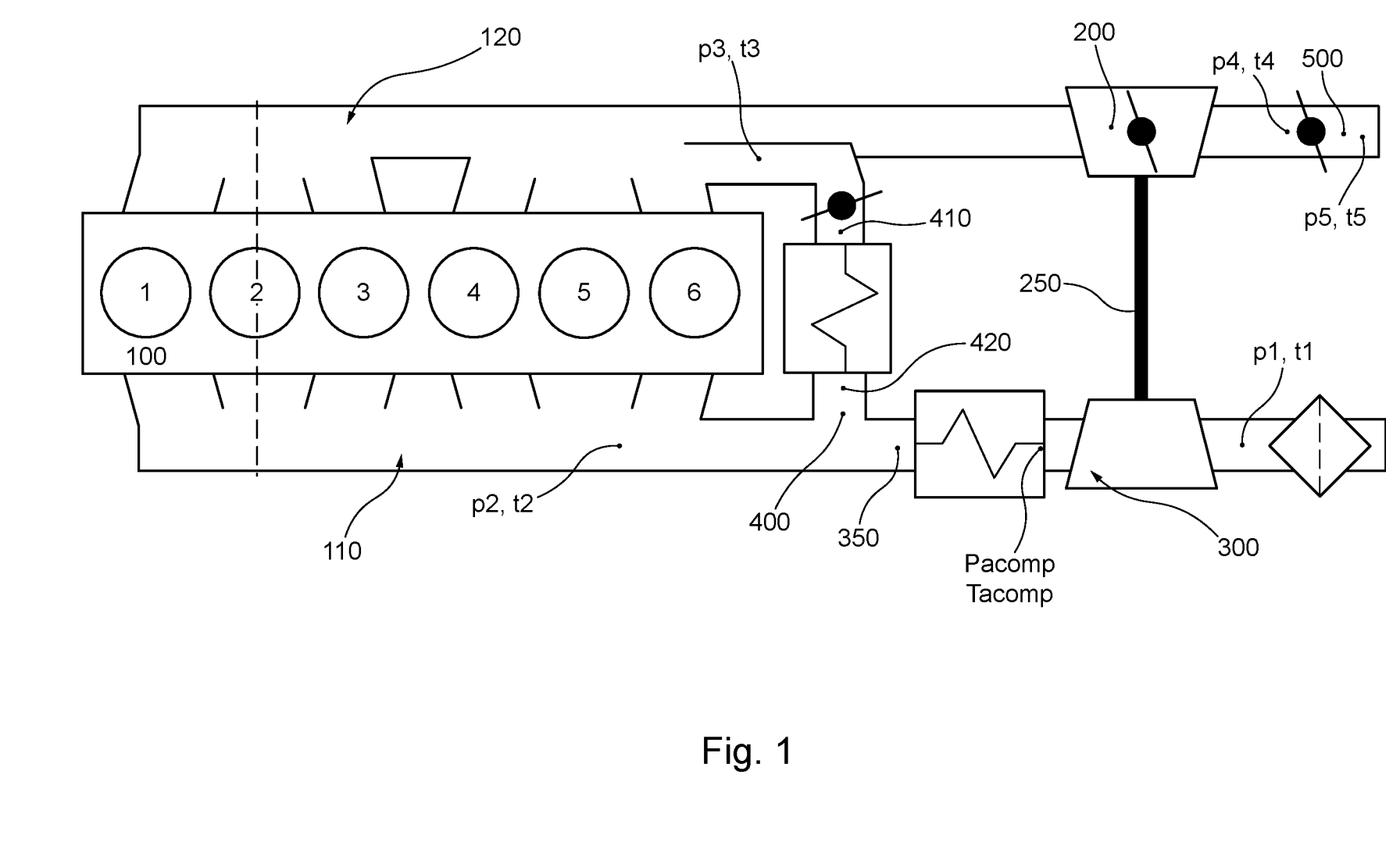
FIG. 1 shows an exemplary layout for understanding the various engine variables that are used in the pressure monitor.

In FIG. 1, a general layout is shown for a combustion engine 100 having an intake manifold 110 and exhaust manifold 120, typically for a 6-cylinder configuration, but not limited thereto. In the figure, a variety of temperature/pressure values $T_1 \ldots T_5/p_1 \ldots p_5$ are shown, that may or may not be directly measured by corresponding sensors provided on the respective locations. Especially for the environment of the exhaust manifold 120, having temperatures and pressures exceeding 500 degrees Celsius and 2 bar respectively, knowing the exact conditions is important. In case sensor equipment is present in the exhaust manifold, this can be monitored and, in the event of a failure, an alternative may be provided. The pre turbine pressure ($p_3$), may be an important control variable for the motor system, in particular for the operation of turbine 200, which may typically be a variable geometry turbine (VGT), as is known to the person skilled in the art, but can also be a fixed turbine. Furthermore, it may be used for engine mass flow calculations, engine control and for EGR flow calculations. The VGT 200 is controlled to generate power for the compressor 300 and is vulnerable for pre turbine pressures exceeding certain thresholds. Further downstream, a back pressure valve 500 may be present, which induces a pressure and temperature drop and contributes to the operating conditions for the VGT 200. Conventionally, the pressure and temperature directly behind the turbine is indicated as $p_4$ (pressure) and $T_4$ (corresponding temperature). Conversely, in the air intake path, just before the compressor 300, temperature and pressures are indicated as $T_1$ and $p_1$ respectively, and the temperature and pressure directly after the compressor will in the subsequent text be called $T_{acomp}$ and $p_{acomp}$. A better estimation of the pre turbine pressure is needed, for instance, to monitor sensor failures. A more accurate pre turbine pressure estimator can be used as a back-up, in case sensor failure is detected. Even, if the estimator is sufficiently accurate, it may be used as primary pre turbine pressure input, e.g. for the engine controllers.

It is an object of the invention to more efficiently monitor a pre turbine pressure ($p_3$).

SUMMARY

Accordingly, an internal combustion engine is provided, comprising; an inlet manifold providing compressed inlet air into a plurality of cylinders; an exhaust manifold for exhausting combusted gases from the plurality of cylinders; a turbine provided in an exhaust channel coupled to the exhaust manifold and a turbocompressor provided in an inlet channel coupled to the inlet manifold. A pressure monitor is arranged to calculate a pre turbine pressure ($p_3$), programmed to:
derive a normalized turbine speed, normalized for a pre turbine temperature, and a heat capacity ratio of exhaust gas before the turbine as first inputs;
determine a turbine power normalizing factor as a second input;
determine an actual turbocompressor power value as a third input;
derive, for said first inputs, a linear relation between a turbine expansion ratio and a turbine power value normalized by the second input;
equate the turbine power value to the actual turbocompressor power; thereby deriving the pre turbine pressure from said linear relation, as an output.

While the monitoring may be suitable for fixed turbines, in case of a variable geometry turbine, an exemplary further input for the model can be a VGT position. It is noted that all variables may be directly measured, or may be derived via alternative estimation methods as further disclosed herein.

BRIEF DESCRIPTION OF THE DRAWINGS

The accompanying drawings, which are incorporated herein and form part of the specification, illustrate the present invention and, together with the description, further serve to explain the principles of the invention and to enable a person skilled in the relevant art(s) to make and use the invention.

DETAILED DESCRIPTION

Unless otherwise defined, all terms (including technical and scientific terms) used herein have the same meaning as commonly understood by one of ordinary skill in the art to which this invention belongs as read in the context of the description and drawings. It will be further understood that terms, such as those defined in commonly used dictionaries, should be interpreted as having a meaning that is consistent with their meaning in the context of the relevant art and will not be interpreted in an idealized or overly formal sense unless expressly so defined herein. In some instances, detailed descriptions of well-known devices and methods may be omitted so as not to obscure the description of the present systems and methods. The term "and/or" includes any and all combinations of one or more of the associated listed items. It will be further understood that the terms "comprises" and/or "comprising" specify the presence of stated features but do not preclude the presence or addition of one or more other features. All publications, patent applications, patents, and other references mentioned herein are incorporated by reference in their entirety. In case of conflict, the present specification, including definitions, will control.

Figure 2:
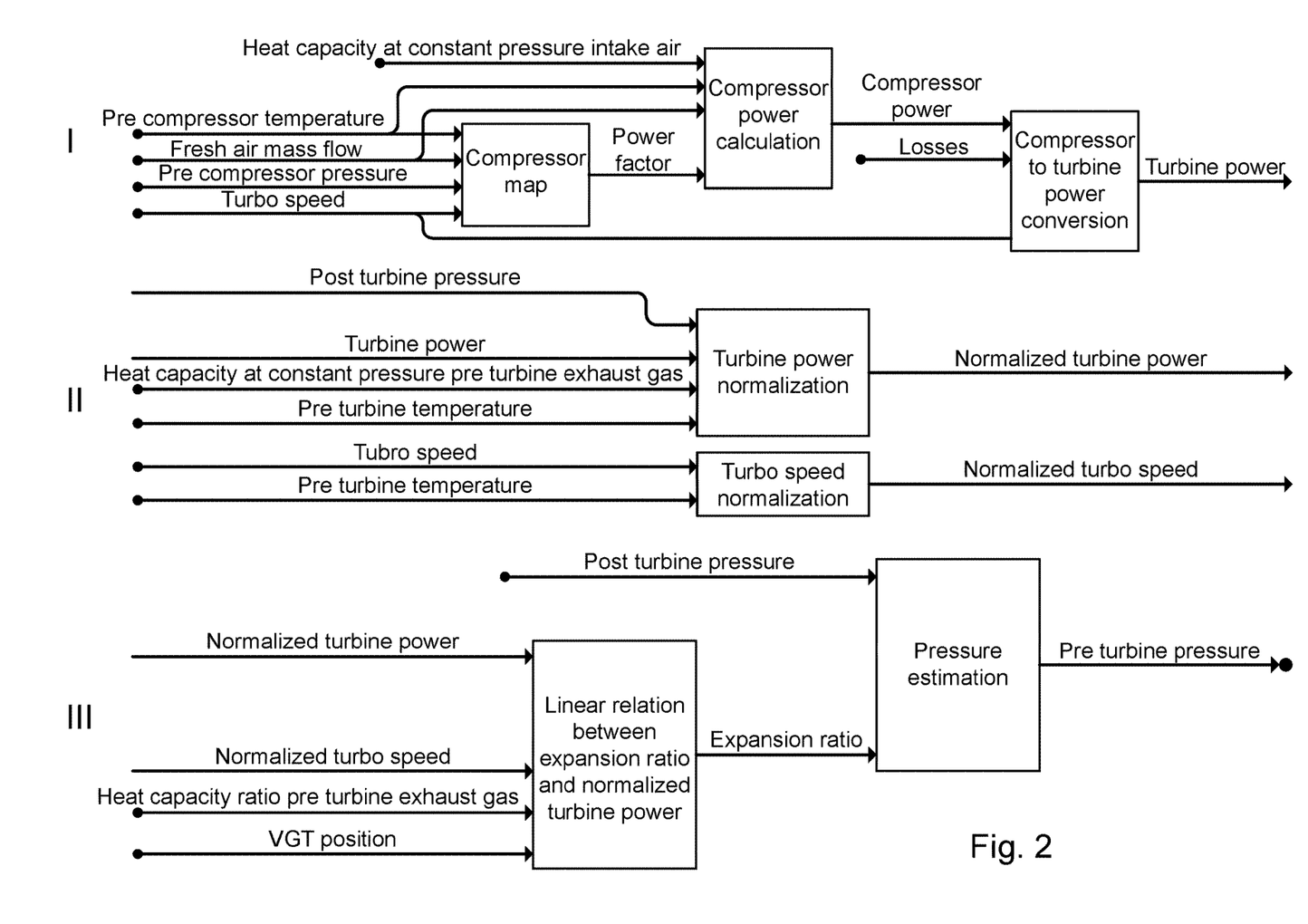
FIG. 2 shows a typical flow of variables to provide an estimation.

In FIG. 2 a compressor map is used to calculate a compressor power factor ($F_{comp}$), based on inputs (normalized) fresh air mass flow ($\dot{m}^*_{air}$) and (normalized) turbine speed ($n^*_{turb}$). In a first step (I) a power factor calculation is derived from a Compressor map, based on pre and post compressor temperature (respectively $T_1$ and $T_{acomp}$), or an estimation using the compressor efficiency ($\eta_{comp}$), in combination with the compressor pressure ratio ($p_{acomp}/p_1$) and heat capacity ratio ($\gamma_{air}$), may also be possible:

$$F_{comp} = MAP(\eta^*_{turb}, \dot{m}^*_{air}) = \frac{T_{acomp}}{T_1} - 1 = \frac{1}{\eta_{comp}}\left(\left(\frac{p_{acomp}}{p_1}\right)^{\frac{\gamma_{air}-1}{\gamma_{air}}} - 1\right)$$

This Power factor is inputted in a Compressor power ($P_{comp}$) calculation routine, which includes the compressor power factor ($F_{comp}$), fresh air mass flow ($\dot{m}^*_{air}$), pre compressor temperature ($T_1$) and heat capacity at constant pressure of intake air ($C_{p,air}$) as follows;

$$P_{comp} = \dot{m}_{air} c_{p,air} T_1 F_{comp}$$

An important step in the estimation is the equation of turbine power to compressor power, which may be corrected by losses, such as additional friction or transient effects. E.g., power loss due to turbo shaft acceleration can be added to the compressor power if deemed necessary.

In a further step (II) a normalized turbine power is calculated, as well as a normalized turbine speed. To this end, standard expressions for turbine power ($P_{turb}$) are given below, using the exhaust gas mass flow ($\dot{m}_{exh}$), the specific heat capacity at constant pressure of the exhaust gas before the turbine ($C_{p,exh}$) and the pre turbine temperature ($T_3$), either in combination with the post turbine temperature ($T_4$) or the turbine efficiency ($\eta_{turb}$), the turbine expansion ratio ($p_3/p_4$) and the heat capacity ratio of exhaust gas before the turbine ($\gamma_{exh}$):

$$P_{turb} = \dot{m}_{exh} c_{p,exh}(T_3 - T_4) = \dot{m}_{exh} c_{p,exh} T_3 \eta_{turb}\left(1 - \left(\frac{p_4}{p_3}\right)^{\frac{\gamma_{exh}-1}{\gamma_{exh}}}\right)$$

Using an expression for normalized exhaust gas mass flow ($\dot{m}^*_{exh}$), this can be rewritten to:

$$P_{turb} = \dot{m}^*_{exh} p_3 \sqrt{T_3}\, c_{p,exh} \eta_{turb}\left(1 - \left(\frac{p_4}{p_3}\right)^{\frac{\gamma_{exh}-1}{\gamma_{exh}}}\right)$$

$$= p_4 \sqrt{T_3}\, c_{p,exh} \dot{m}^*_{exh}\left(\frac{p_3}{p_4}\right) \eta_{turb}\left(1 - \left(\frac{p_4}{p_3}\right)^{\frac{\gamma_{exh}-1}{\gamma_{exh}}}\right)$$

The last part of this equation is now defined as the normalized turbine power ($P^*_{turb}$), which can be computed from a turbine efficiency datasheet, that contains the turbine expansion ratio, normalized flow, heat capacity ratio and turbine efficiency and turbine speed. Different normalized turbine powers may be found for different VGT positions. The following relation to the standard turbine power is obtained:

$$P^*_{turb} = \dot{m}^*_{exh}\left(\frac{p_3}{p_4}\right)\eta_{turb}\left(1 - \left(\frac{p_4}{p_3}\right)^{\frac{\gamma_{exh}-1}{\gamma_{exh}}}\right) = \frac{1}{p_4 c_{p,exh}\sqrt{T_3}} P_{turb}$$

Accordingly, a turbine power normalizing factor is a product of post turbine pressure ($p_4$); heat capacity at constant pressure of exhaust gas ($c_{p,exh}$) and square root of the pre turbine temperature ($T_3$).

In addition, in the second step (II), the turbine speed is normalized with the turbine inlet temperature to provide robustness for deviations in turbine inlet conditions:

$$n^*_{turb} = \frac{n_{turb}}{\sqrt{T_3}}$$

Accordingly, a normalized turbine speed may be calculated from a quotient of the turbine speed and a square root of the pre turbine temperature. A pre turbine temperature may be measured directly or derived, e.g. from the turbine power and a measured post turbine temperature.

In FIG. 2, the turbine power is estimated by equating it to the calculated compressor power. It was found that for a constant VGT position, normalized turbine speed and heat capacity ratio, an approximately linear relation between turbine expansion ratio and normalized turbine power exists. This relationship is used in a further step (III), wherein an expansion ratio is derived from a linear relation between the expansion ratio and the calculated normalized turbine power. A pre turbine pressure ($p_3$) can then be derived from a post turbine pressure ($p_4$), used as input, and a calculated expansion ratio, as will be further illustrated with reference to FIG. 3.

A back pressure valve (BPV) may be present in the system, in which case a post turbine pressure can be derived, by calculating a pressure difference based on a back pressure valve position, exhaust gas mass flow, and BPV outlet pressure and temperature. Thus, in a pre turbine pressure estimation algorithm, the estimated normalized turbine power is used, together with VGT position, turbine speed, heat capacity ratio and post turbine pressure to estimate the pre turbine pressure. Accordingly, a pressure monitor is provided, arranged to calculate a pre turbine pressure ($p_3$), wherein the pressure monitor is programmed to:

derive a normalized turbine speed, normalized for a pre turbine temperature, and a heat capacity ratio of exhaust gas before the turbine as first inputs;

determine a turbine power normalizing factor as a second input;

determine an actual turbocompressor power value as a third input;

derive, for said first inputs, a linear relation between a turbine expansion ratio and a turbine power value normalized by the second input;

equate the turbine power value to the actual turbocompressor power; thereby deriving the pre turbine pressure from said linear relation, as an output.

In a preferred embodiment, the turbine may be a variable geometry turbine having an adjustable turbine nozzle position or by vanes that can be adjusted; wherein said linear relation is further derived for each turbine position.

Figure 3:
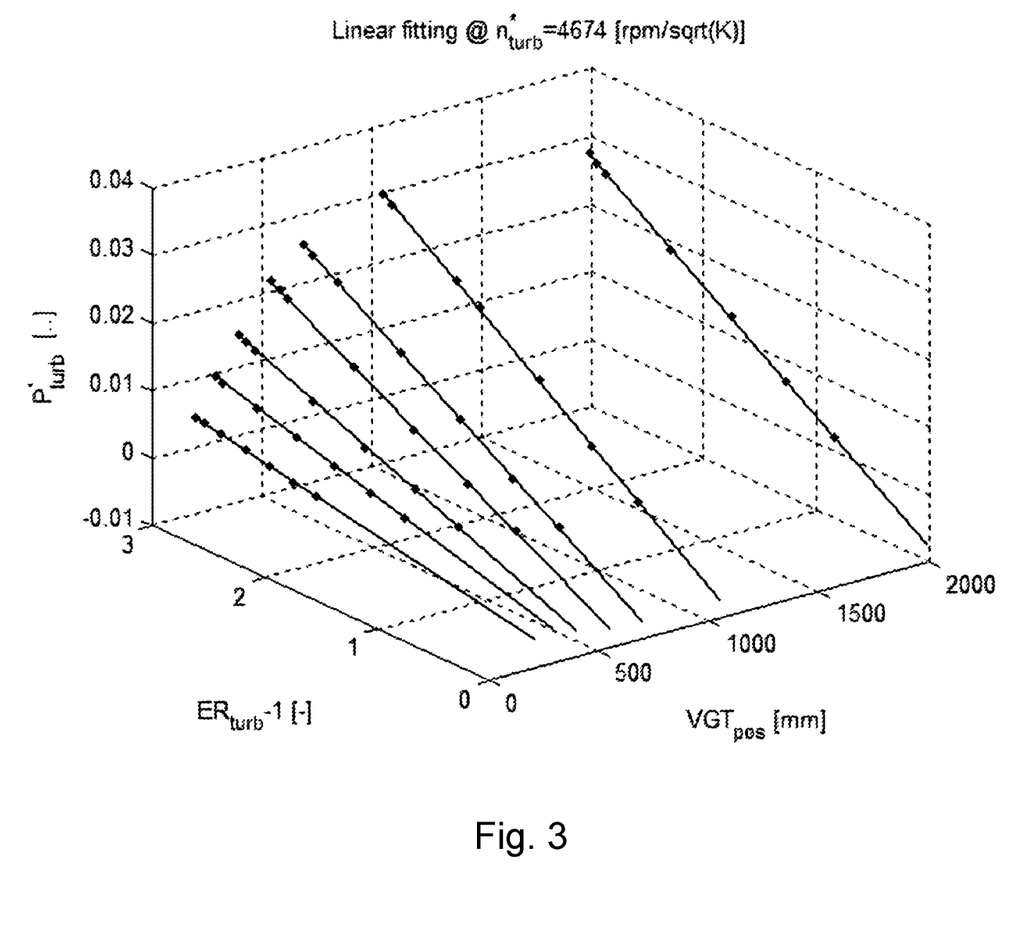
FIG. 3 shows exemplary linear calibration curves that correlate a turbine expansion ratio to a normalized turbine power.

In FIG. 3 exemplary linear relations are given that may be derived by plotting the turbine expansion ratio relative to the normalized turbine power. For a constant VGT position and normalized turbine speed, an approximately linear relation between the turbine expansion ratio and normalized turbine power exists.

This means, the normalized turbine power can be estimated using a linear line. A line can be described using a constant and an offset. For each VGT position, normalized turbine speed and heat capacity ratio, a different constant and offset are needed to estimate the normalized turbine power, so:

$$C_0 = MAP(VGT, n^*_{turb}, \gamma_{exh})$$

$$C_1 = MAP(VGT, n^*_{turb}, \gamma_{exh})$$

$$P^*_{turb} = \left(\frac{p_3}{p_4} - 1\right)C_1 + C_0$$

From this relation, the pre turbine pressure ($p_3$) can be estimated.

$$p_3 = \frac{P^*_{turb} p_4 - C_0 p_4}{C_1} + p_4 \quad \quad 5$$

Advantage of this method, besides the high accuracy, is that the pre turbine estimate is less sensitive to exhaust mass flow deviations. Also, the dependency on heat capacity ratio is relatively minor, so it can be decided to omit this input and have a 2D C0 and C1 map, which is easy to implement.

The disclosed method can be used to estimate the exhaust manifold pressure, using the turbine power, post turbine pressure, pre turbine temperature, turbine speed, exhaust gas gas properties, and in case of a variable geometry turbo, the VGT position.

The model can for example be used for a plausibility check of a pre turbine pressure sensor, or as a replacement.

Direct model inputs:

$n_{turb} n_{turb}$ Turbine speed
  May be measured with a turbine speed sensor or estimated using a compressor model $p_4$ Post turbine pressure
  May be measured with a pressure sensor or estimated based on a pressure sensor further downstream in the air path, in combination with a pressure drop model of the intermediate air path (using e.g., the exhaust gas mass flow and the temperature of the exhaust gas)

$P_{turb}$ Turbine power
  May be estimated from the temperature before ($T_3$) and after the turbine ($T_4$), the exhaust gas mass flow ($\dot{m}_{exh}$) and the heat capacity at constant pressure ($c_{p,exh}$):

$$P_{turb} = \dot{m}_{exh} c_{p,exh} (T_3 - T_4)$$

The temperature after the turbine may be measured using a temperature sensor (but might also be estimated based on a temperature sensor further downstream in the air path). The exhaust gas flow can be measured directly or estimated based on the fresh air flow.

According to the invention, the turbine power may also be estimated based on the compressor power ($P_{comp}$), possibly also taking the estimated power lost due to turbo inertia ($P_{I,turbo}$) and the estimated power lost to mechanical losses (e.g. friction) ($P_{loss}$) into account:

$$P_{turb} = P_{comp} + P_{I,turbo} + P_{loss}$$

The estimated compressor power can be based on the fresh air flow ($\dot{m}_{air}$), the heat capacity at constant pressure of the intake air ($c_{p,air}$), the pre compressor temperature ($T_1$) and the compressor power factor ($F_{comp}$):

$$P_{comp} = \dot{m}_{air} c_{p,air} T_1 F_{comp}$$

The pre compressor temperature can be measured (but can also be estimated based on a temperature further upstream in the air path). The intake air heat capacity at constant pressure can be estimated based on the intake air composition and the temperature before the compressor, or selected as a constant. The fresh air flow can either be estimated or measured using an air flow meter. The compressor power factor can be determined in several ways, e.g.:

Based on a lookup table based on (normalized) turbo speed ($n^*_{turb}$) and (normalized) flow ($\dot{m}_{air}$):

$$F_{comp} = \text{MAP}(n^*_{turb}, \dot{m}_{air})$$

Normalization is optional and can be done in several ways. For turbo speed, this can for example be based on inlet conditions $$\frac{n_{turb}}{\sqrt{T_1}},$$

standard normalization) or a Mach number $$\left( \frac{n_{turb} r_c}{\sqrt{\kappa_{air} R_{air} T_1}} \right).$$

For flow, this can for example be based on inlet conditions $$\left( \frac{\dot{m}_{air} \sqrt{T_1}}{p_1}, \right.$$

standard normalization) or a dimensionless flow $$\left( \frac{\dot{m}_{air}}{n_{turb} \rho_{air} r_c^3} \right).$$

Based on the temperature before ($T_1$) and after the compressor ($T_{acomp}$):

$$F_{comp} = \frac{T_{acomp}}{T_1} - 1$$

The temperature at the compressor inlet can be measured but can also be estimated based on a temperature further upstream in the air path. The temperature after the compressor can be measured, or estimated based on the compressor efficiency, pressure ratio and turbine speed Based on the pre compressor pressure ($p_1$), the post compressor pressure ($p_{acomp}$), the heat capacity ratio of intake air ($\gamma_{air}$), and the compressor efficiency ($\eta_{comp}$):

$$F_{comp} = \frac{1}{\eta_{comp}} \left( \left( \frac{p_{acomp}}{p_1} \right)^{\frac{\gamma_{air}-1}{\gamma_{air}}} - 1 \right)$$

The pressure before the compressor ($p_1$) can be measured or estimated based on a pressure sensor further upstream in the air path. The pressure after the compressor can be measured or estimated based on a pressure sensor further downstream in the air path. The heat capacity ratio of intake air can be estimated based on the intake air gas composition and the temperature before the compressor, or selected as a constant. The compressor efficiency can be determined from a 2D lookup table, using at least 2 of the following signals: pressure ratio, fresh air mass flow, or turbine speed. Fresh air mass flow and turbine speed can be normalized to provide robustness against deviating compressor inlet conditions.

$T_3$ Pre turbine temperature (often equal to exhaust manifold temperature)
May be measured with a temperature sensor or estimated based on the turbine power ($P_{turb}$), the exhaust gas mass flow ($\dot{m}_{exh}$), the heat capacity at constant pressure of the exhaust gas ($c_{p,exh}$), and the temperature after the turbine ($T_4$):

$$T_3 = \frac{P_{turb}}{\dot{m}_{exh} c_{p,exh}} + T_4$$

The temperature after the turbine is usually measured using a temperature sensor (but might also be estimated based on a temperature sensor further downstream in the air path). The exhaust gas flow can be estimated based on the fresh air flow or measured directly. The turbine power can be determined using the compressor power (as described above). For the estimation of the pre turbine pressure, the compressor power estimate may be based on the compressor pressure ratio:

$$P_{comp} = \dot{m}_{air} c_{p,air} T_1 \frac{1}{\eta_{comp}} \left( \left( \frac{p_{acomp}}{p_1} \right)^{\frac{\gamma_{air}-1}{\gamma_{air}}} - 1 \right)$$

VGT VGT position
This is an actuator value that is prescribed. If an engine with a fixed geometry turbo is used, the dependency on VGT position can be discarded.
$\gamma_{exh}$ Heat capacity ratio of the exhaust gas before the turbine
May be estimated based on the exhaust gas composition and the temperature before the turbine or selected as a constant
$c_{p_{exh}}$ Heat capacity at constant pressure of the exhaust gas before the turbine
May be estimated based on the exhaust gas composition and the temperature before the turbine or selected as a constant
Additional explanation of indirect model inputs:
$\dot{m}_{exh}$ Exhaust gas mass flow
May be measured using a flow meter in the exhaust path or estimated using fresh air mass flow, fuel flow, and blowby $$\dot{m}_{exh} = \dot{m}_{air} + \dot{m}_{fuel} - \dot{m}_{blowby}$$

$\dot{m}_{air}$ Fresh air mass flow
May be measured using a flow meter in the intake path or estimated using e.g.:
A compressor model;
The pressure drop over the air filter
An engine out O2 sensor
A total engine flow (for example estimated using a volumetric efficiency based model). If the engine contains an EGR path, the EGR flow (e.g. determined using a model based on the EGR valve position and pressure drop over the EGR path, a Venturi in combination with a sensor measuring the pressure drop between the Venturi in- or outlet and the Venturi throat, or a flow measurement device) may be subtracted from the engine flow
A fresh air flow measurement device
Other variations to the disclosed embodiments can be understood and by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single unit may fulfil the functions of several items recited in the claims. The mere fact that certain measures are recited in mutually different dependent claims does not indicate that a combination of these measured cannot be used to advantage. Any reference signs in the claims should not be construed as limiting the scope.

The invention claimed is:
1. An internal combustion engine comprising:
an inlet manifold providing compressed inlet air into a plurality of cylinders;
an exhaust manifold for exhausting combusted gases from the plurality of cylinders;
a turbine provided in an exhaust channel coupled to the exhaust manifold;
a turbocompressor provided in an inlet channel coupled to the inlet manifold;
a pressure monitor comprising a computing device arranged to calculate a pre turbine pressure (p3), wherein the computing device is programmed to:
receive data from one or more of the inlet manifold, the exhaust manifold, the turbine, or the turbocompressor;
derive, based on the data, a normalized turbine speed, normalized for a pre turbine temperature, and a heat capacity ratio of exhaust gas before the turbine as first inputs;
determine a turbine power normalizing factor as a second input;
determine, based on the data, an actual turbocompressor power value as a third input;
derive, for said first inputs, a linear relation between a turbine expansion ratio and a turbine power value normalized by the second input;
generate an output by equating the turbine power value to the actual turbocompressor power, thereby deriving the pre turbine pressure from said linear relation; and
modify, based on the output, an operating parameter of the internal combustion engine.
2. The internal combustion engine according to claim 1, wherein the turbine power normalizing factor is a product of post turbine pressure, heat capacity at constant pressure of the exhaust gas and square root of the pre-turbine temperature.
3. The internal combustion engine according to claim 1, wherein the normalized turbine speed is calculated from a quotient of the turbine speed and a square root of the pre-turbine temperature.
4. The internal combustion engine according to claim 1, wherein the pre-turbine temperature is measured directly or derived from the turbine power and a post turbine temperature.
5. The internal combustion engine according to claim 1, wherein the turbine is a variable geometry turbine having an adjustable turbine nozzle position, wherein said linear relation is further derived for each turbine nozzle position.
6. The internal combustion engine according to claim 1, wherein the turbocompressor power is derived from a product of compressor mass flow, heat capacity at constant pressure of intake air, pre-compressor temperature, and a power factor, based on a compressor mass flow normalized for pre-compressor pressure and temperature, and a turbo speed normalized for pre-compressor temperature.

7. A method for monitoring a pre turbine pressure of in internal combustion engine comprising a turbine provided in an exhaust channel coupled to an exhaust manifold and a turbocompressor provided in an inlet channel coupled to an inlet manifold of the internal combustion engine, the method comprising:
- receiving data from one or more of the inlet manifold, the exhaust manifold, the turbine, or the turbocompressor;
- deriving, by a computing device and based on the data, a turbine speed, normalized for a pre turbine temperature, and a heat capacity ratio of exhaust gas before the turbine as first inputs;
- determining, by the computing device and based on the data, a turbine power normalizing factor as a second input;
- determining, by the computing device and based on the data, an actual turbocompressor power value as a third input;
- deriving, for said first inputs, a linear relation between a turbine expansion ratio and a turbine power value normalized by the second input;
- generating an output by equating the turbine power value to the actual turbocompressor power; thereby deriving the pre turbine pressure from said linear relation, as an output; and
- modifying, based on the output, an operating parameter of the internal combustion engine.

8. The method of claim 7, wherein the turbine power normalizing factor is a product of post turbine pressure, heat capacity at constant pressure of the exhaust gas and square root of the pre-turbine temperature.

9. The method of claim 7, wherein the normalized turbine speed is calculated from a quotient of the turbine speed and a square root of the pre-turbine temperature.

10. The method of claim 7, wherein the pre-turbine temperature is measured directly or derived from the turbine power and a post turbine temperature.

11. The method of claim 7, wherein the turbine is a variable geometry turbine having an adjustable turbine nozzle position, wherein said linear relation is further derived for each turbine nozzle position.

12. The method of claim 7, wherein the turbocompressor power is derived from a product of compressor mass flow, heat capacity at constant pressure of intake air, pre-compressor temperature, and a power factor, based on a compressor mass flow normalized for pre-compressor pressure and temperature, and a turbo speed normalized for pre-compressor temperature.

* * * * *